United States Patent
Ezaki (10) Patent No.: US 7,484,976 B2
(45) Date of Patent: Feb. 3, 2009

(54) CARD CONNECTOR (75) Inventor: Masakazu Ezaki, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 12/003,127

(22) Filed: Dec. 20, 2007

(65) Prior Publication Data
US 2008/0160805 A1    Jul. 3, 2008

(30) Foreign Application Priority Data
Dec. 27, 2006    (JP)    ............... 2006-351563

(51) Int. Cl.
H01R 13/62    (2006.01)
(52) U.S. Cl. .................................... 439/159
(58) Field of Classification Search ............. 439/159, 439/152, 157, 602, 630
See application file for complete search history.

(56) References Cited

U.S. PATENT DOCUMENTS 7,220,138 B2 *   5/2007   Miyamoto et al. .......... 439/159
7,261,576 B2 *   8/2007   Miyamoto et al. .......... 439/159
7,341,465 B2 *   3/2008   Sun et al. .................... 439/141

FOREIGN PATENT DOCUMENTS

JP    2001-326028    11/2001

* cited by examiner

Primary Examiner—Jean F Duverne
(74) Attorney, Agent, or Firm—Kubotera & Associates, LLC (57) ABSTRACT A card connector include a housing with a contact; an ejector provided inside the housing to be slidable between a holding position and a temporary holding position in a card insertion and pull-out direction; and an elastic member provided inside the housing for urging the ejector from the holding position to the temporary holding position. The ejector has a corresponding locking portion to be locked with a locking portion of the card. The ejector is slidable between the holding position and the temporary holding position while being locked with the locking portion. When the card is moved toward the card insertion slot beyond the temporary holding position, the corresponding locking portion contacts with the card. Accordingly, the corresponding locking portion moves away from the locking portion, and the elastic member moves away from the locking portion, so that the locking portion is unlocked from the corresponding locking portion.

13 Claims, 10 Drawing Sheets

CARD CONNECTOR

BACKGROUND OF THE INVENTION AND RELATED ART STATEMENT

The present invention relates to a card connector. Specifically, the present invention relates to a card connector having a temporary holding mechanism.

Various types of card connectors have been developed to connect a card such as a SD card or a memory stick to a circuit of a device. For example, there is a card connector having an ejector to move with a card for easier insertion and pull-out of the card. When the card is inserted or pulled out, the ejector moves for a specific distance with the card using an elastic force of a spring or the like.

A temporary holding unit is often provided for holding a card temporarily upon moving to avoid an inadvertent popping out of the card when the ejector moves suddenly. For example, in a conventional card connector according to Japanese Patent Publication No. 2001-326028, an ejector having a spring property is formed of a temporary holding structure. That is, a card locking portion, a part of the ejector, is formed in a spring shape.

Patent Reference: Japanese Patent Publication No. 2001-326028

In the conventional card connector disclosed in Patent Reference, a card hook portion of the ejector has a spring property to temporary hold the card. Accordingly, when the card is temporarily held after ejected, a locking force of the card is not sufficient enough or an excessive locking force may cause a deformation or fatigue of the spring.

In the conventional card connector, the ejector needs to be formed in an appropriate shape to obtain an appropriate locking force during the temporary holding state. However, it is often difficult to determine a shape of the ejector since cards and connectors have been continuously downsized. As a result, it has been difficult to obtain an enough locking force in the temporary holding state.

In view of the problems of the conventional technology described above, an objective of the present invention is to provide a card connector, in which an elastic member (spring) is integrated with an ejector for improving a locking force of a card in a temporary holding state, rather than adjusting a shape of the ejector.

Further objects and advantages of the invention will be apparent from the following description of the invention.

SUMMARY OF THE INVENTION

In order to obtain the objects described above, according to the present invention, a card connector receives a card through a card insertion slot.

The card connector comprises: a housing in which a contact is arranged for contacting with the card when the card is accommodated; an ejector provided inside the housing to be slidable with the card between a holding position away from the card insertion slot and a temporary holding position close to the card insertion slot at least along a card insertion and pull-out direction for inserting and pulling out the card; and an elastic member provided inside the housing. The elastic member is arranged along the card insertion and pull-out direction in parallel to the ejector for urging the ejector from the holding position to the temporary holding position.

Further, the ejector is situated between a reception space of the housing for accommodating the card and the elastic member in the card insertion and pull-out direction. The ejector has a corresponding locking portion to be locked with a locking portion provided on a side surface of the card inserted into the reception space inside of the housing along the card insertion and pull-out direction. The ejector is slidable between the holding position and the temporary holding position while being locked with the locking portion.

Further, when the card is moved toward the card insertion slot beyond the temporary holding position, the corresponding locking portion contacts with a part of the side surface of the card along the card insertion and pull-out direction. Accordingly, the corresponding locking portion moves away from the locking portion in a direction crossing the card insertion and pull-out direction. At the same time, the elastic member moves away from the locking portion in the direction crossing the card insertion and pull-out direction. Accordingly, the locking portion is unlocked from the corresponding locking portion. A locking force between the locking portion and the corresponding locking portion is regulated with the elastic member.

According to the present invention, the card connector may have at least a cover for covering a top surface of the housing. A size of an opening provided in a side surface of the cover may regulate an amount of the corresponding locking portion moves away from the locking portion in the direction crossing the card insertion and pull-out direction.

According to the present invention, in the card connector, a slide guide protruding upwardly or downwardly may be provided on the ejector for regulating a slide position of the ejector using the cover and the housing. The cover may be provided with a guide rail corresponding to the slide guide protruding upwardly. Alternatively, the housing may be provided with a guide rail corresponding to the slide guide protruding downwardly. Further, one of the guide rail of the cover situated in the card insertion slot side and the guide rail of the housing may include a space extending toward away from the locking portion.

According to the present invention, the ejector may include a first portion extending along the card insertion and pull-out direction in parallel to the elastic member and a second portion extending from the first portion and away from the locking portion in the direction crossing the card insertion and pull-out direction. Further, an end portion of the elastic member on a side of the card insertion slot may be integrated with the second portion of the ejector extending away from the locking portion.

Further, the corresponding locking portion may be integrated with the end portion of the elastic member on the side of the card insertion slot near the locking portion. The corresponding locking portion may be arranged to move away from the locking portion together with the end portion on the side of the card insertion slot in the direction crossing the card insertion and pull-out direction.

According to the present invention, in the card connector, the ejector may be provided with a grip portion for griping a front wall of the card on a side of the side surface of the card. Further, the corresponding locking portion may move away from the locking portion with a portion near the grip portion as a supporting point.

According to the present invention, in the card connector, a sidewall may be provided along the card insertion and pull-out direction on a side away from the locking portion with respect to the elastic member. A recess portion may be provided in a part of the sidewall, so that the end portion of the elastic member moves away from the locking portion using the recess portion. At the same time, the corresponding locking portion moves away from the locking portion.

According to the present invention, in the card connector, when the end portion of the elastic member moves away from the locking portion, a position at which the elastic member and the sidewall contact with each other may be adjusted. Accordingly, a locking force between the locking portion and the corresponding locking portion may be regulated.

Further, in the card connector described above, the elastic member may be made of a coil spring. Further, the ejector described above may be made of a metal.

DETAILED DESCRIPTION OF PREFERRED EMBODIMENTS

Hereunder, embodiments of the present invention will be explained with reference to the accompanying drawings. A card connector is a push-push type.

Figure 1:
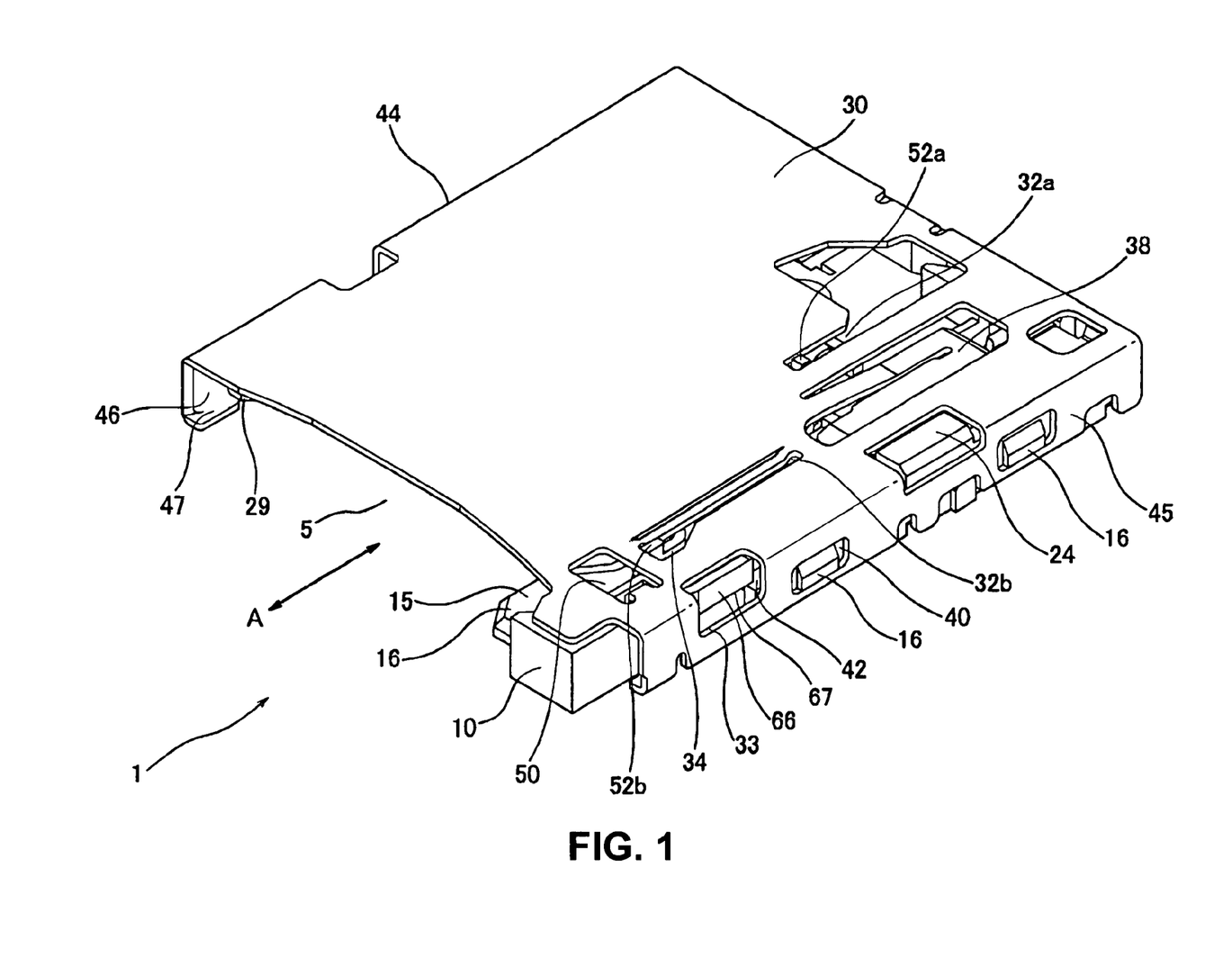
FIG. 1 is a perspective view showing a card connector according to an embodiment of the present invention.
Figure 2:
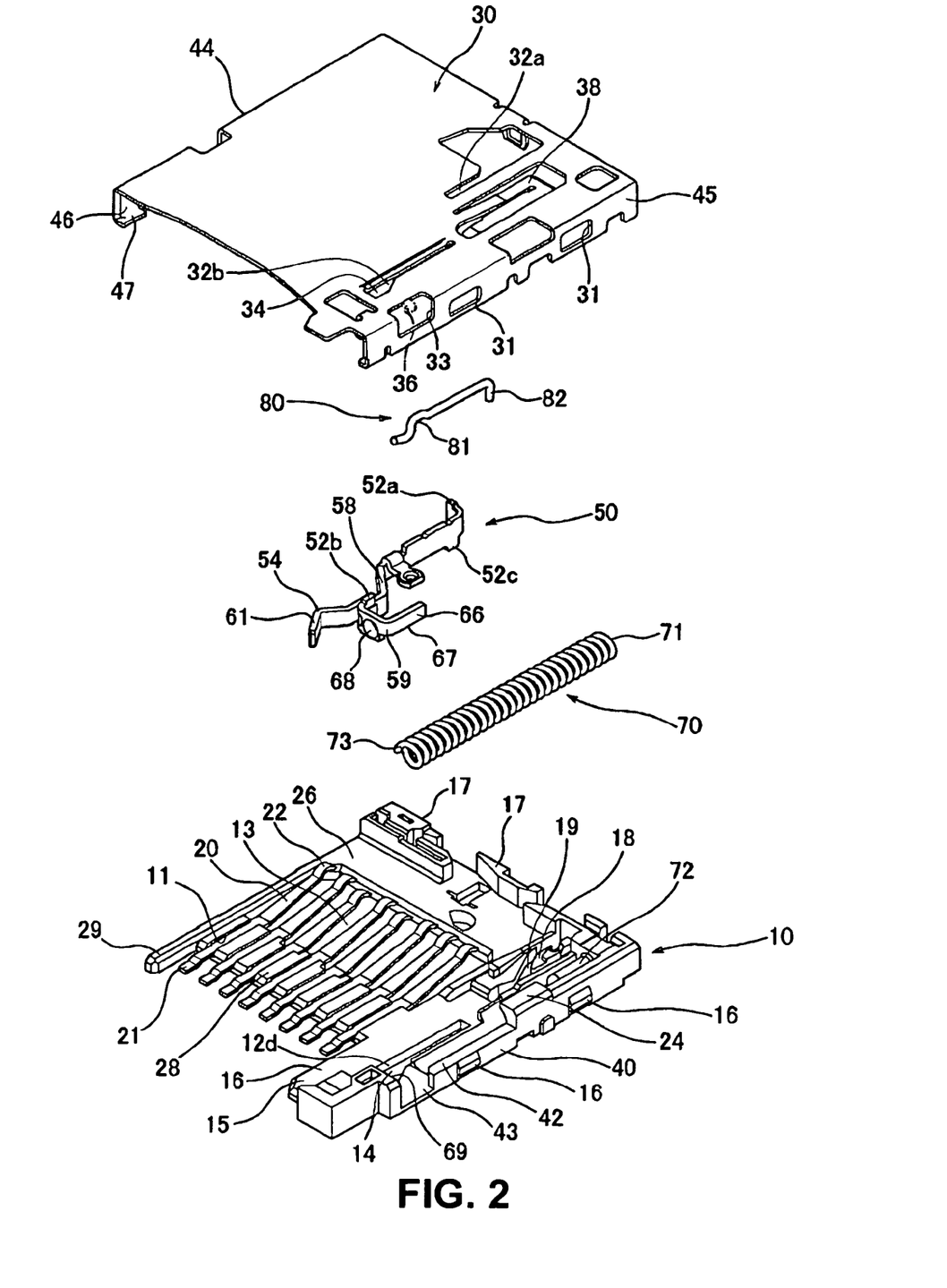
FIG. 2 is an exploded view of the card connector according to the embodiment of the present invention.
Figure 3:
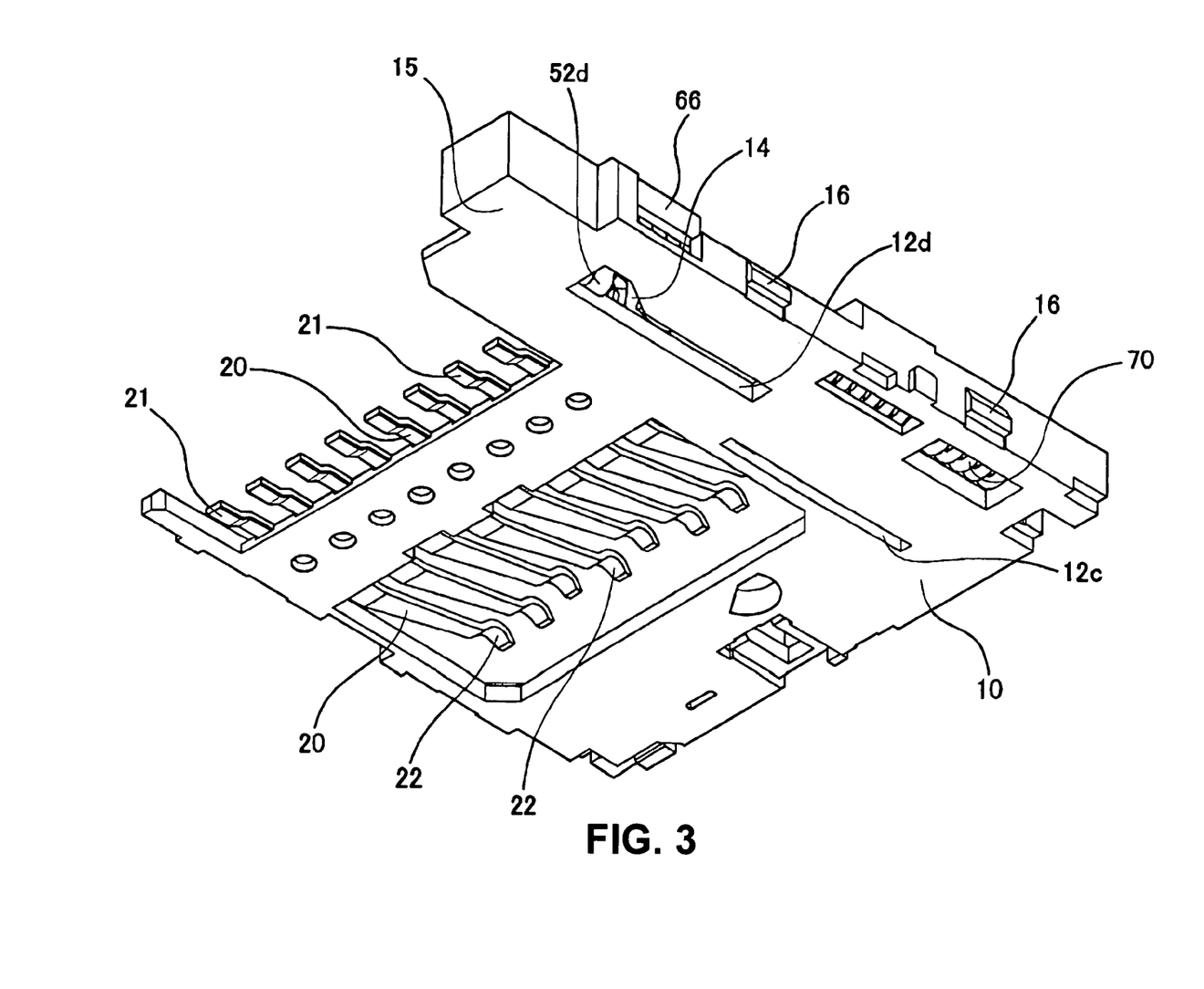
FIG. 3 is a perspective view showing a backside of the card connector according to the embodiment of the present invention.
Figure 4A:
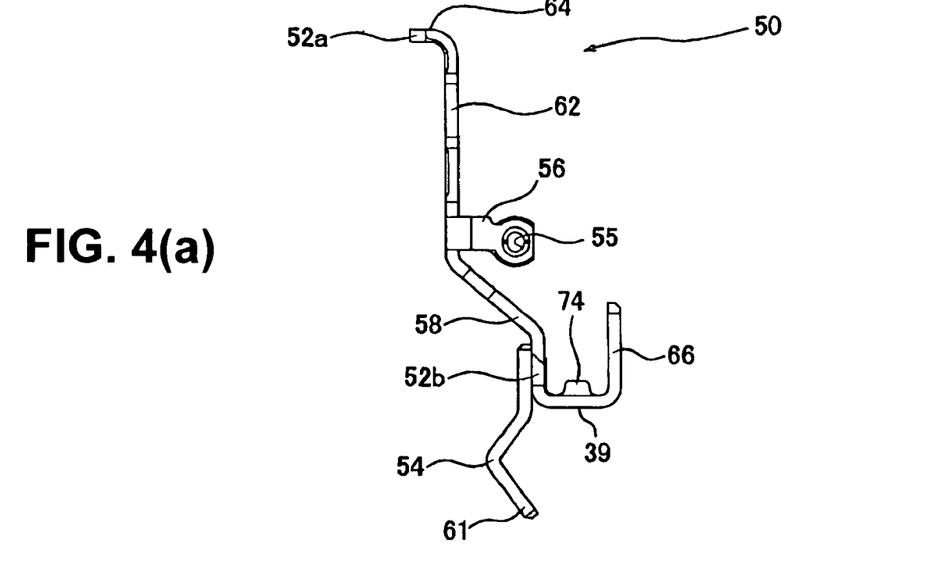
FIGS. 4(a) to 4(b) are views showing a top surface, and a side surface of an ejector, respectively according to the embodiment of the present invention.
Figure 4B:
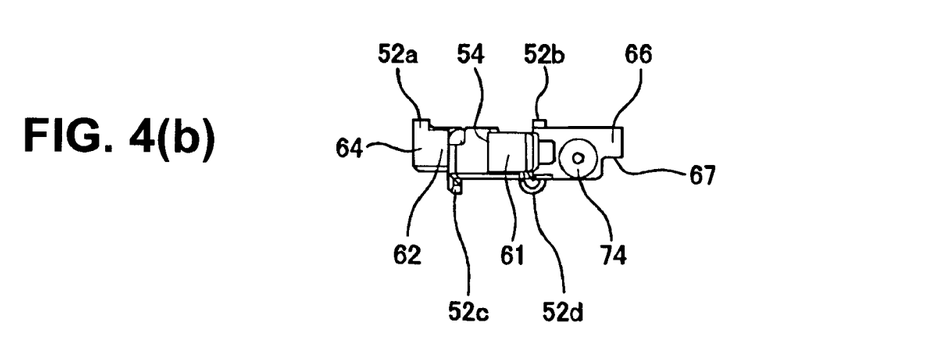
Figure 4C:
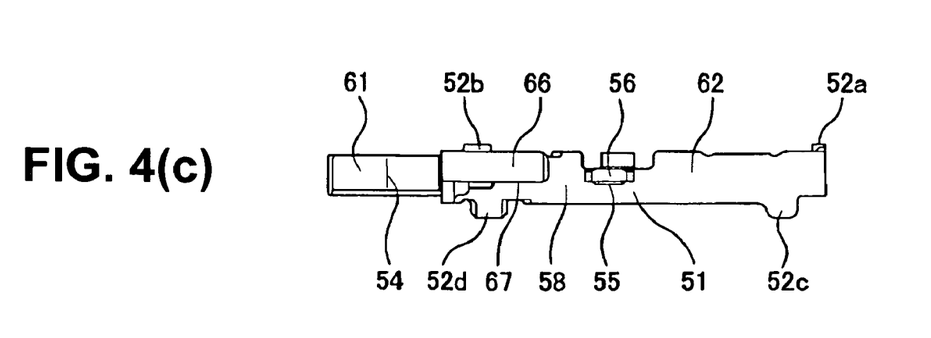

FIG. 1 shows a perspective view of a card connector 1 according to an embodiment of the present invention. FIG. 2 shows an exploded perspective view of FIG. 1. FIG. 3 shows a perspective view of a back side of FIG. 1 without a cover 30. Further, FIGS. 4(a) to 4(c) show a top surface, a front surface, and a side surface of an ejector 50, respectively, shown in FIG. 1.

The card connector 1 comprises a housing 10, contacts 20, the ejector 50, a spring 70, a pin 80, and the cover 30. The housing 10 is made of a resin. The contacts 20 made of metal and the ejector 50 are accommodated in the housing 10. The spring 70 made of metal and the pin 80 are connected to the ejector 50 to be accommodated in the housing 10. The cover 30 covers a top and side surfaces of the housing 10.

A card insertion slot 5 is formed in a rear side of the card connector as an opening, so that a card can be accommodated in the housing 10 through the cared insertion slot 5. Further, the card may be freely inserted or pulled out in a card insertion and pull-out direction (arrow A direction in FIG. 1). Although a card with a large or small size may be inserted, the card connector 1 is most effective when a small card such as a mini-SD or a micro-SD is inserted. The card connector 1 may be designed to be small to accommodate such small cards.

The housing 10 is a base of the card connector 1 and comprises arm portions 15 and 29, a front plate 26, and a middle plate 28. The arm portion 15 having a relatively wide width extends along the card insertion and pull-out direction, while the arm portion 29 having a relatively small width extends in the direction.

In the embodiment, the front plate 26 connects the arm portions 15 and 29 in a front portion. The middle plate 28 connects the arm portions 15 and 29 in a middle portion. The arm portion 15 has a planar portion 16 and a sidewall 40 outside thereof. The ejector 50, the spring 70, and the pin 80 are arranged on the planar portion 16.

In the embodiment, the arm portion 29 has a rod shape, and a side surface thereof on a side of the arm portion 29 of the housing 10 opens. A front wall 17 is provided in the front plate 26 for substantially closing the front portion of the housing 10. Further, a plurality of press fit portions 11 is provided to arrange a plurality of the contacts 20 in the card insertion and pull-out direction in the middle plate 28.

The contacts 20 are inserted into the press fit portions 11 provided in the housing 10 along the card insertion and pull-out direction from a side of a substrate installation portion 21. The contacts 20 are arranged parallel to each other. When a card 3 is accommodated in the card connector 1, each pad (not shown) on the card 3 can contact with the corresponding contact 20. A contact portion 22 of the contact 20 provided in the press fit portion 11 is slightly displaced upwardly to ensure a contact with the pad of the card 3.

The cover 30 covers a front portion, a top portion, and right and left sides of the housing 10. When the cover 30 covers the housing 10, the housing 10 is formed as a card connector having an approximate box shape. At this time, the open side surface on the side of the arm portion 29 of the housing 10 is covered by a side surface 44 of the cover 30.

When the card 3 is accommodated in the card connector 1 or when the card 3 is inserted or pulled out, one of the side surfaces of the card 3 is supported with an inner wall 46 of the side surface 44. The cover 30 is fixed to the housing 10 when an edge 47 of the side surface 44 is hooked at a bottom portion of the arm portion 29. The cover 30 may be fixed to the housing 10 by, for instance, snapping engaging protrusions 16 in a plurality of engaging holes 31 provided in a side surface 45 of the other side.

In the embodiment, the engaging protrusions 16 are provided on the sidewall 40 arranged in the arm portion 15 of the housing 10. A spring 38 and guide rails 32a and 32b are provided on a top surface of the cover 30. The spring 38 prevents the card 3 from popping out or jouncing in a top-to-bottom direction. Further, the guide rails 32a and 32b guide a slide movement of the ejector 50.

The spring 70 is used to bias the ejector 50. A coil spring, for example, is used as one of preferred elastic members. The spring 70 is provided in the arm portion 15 of the housing 10 along the card insertion and pull-out direction, so that the spring 70 can be elastically displaced parallel to the ejector 50.

The housing 10 is provided with a spring holding portion 72 to determine a position of the spring 70. The spring holding portion 72 protrudes toward a card pull-out side. The spring 70 is provided at a specific position of the housing 10 through a support portion 24. At this time, the spring holding portion 72 is inserted into a hollow space portion of one end portion 71 of the spring 70. Further, the support portion 24 is provided to cover a top portion of the spring 70.

In the embodiment, the ejector 50 can slide and move with the card 3 inside the housing 10 along the card insertion and pull-out direction to insert and pull out the card 3 while being locked with the card 3. The ejector 50 is positioned between a reception space 13 inside the housing 10 in which the card 3 is accommodated and the elastic member 70 in the card insertion and pull-out direction.

In the embodiment, the ejector 50 can substantially move along the card insertion and pull-out direction between a holding position of a side far from the card insertion slot 5 (position in FIG. 5 to be described later) and a temporary holding position of a side close to the card insertion slot 5 (positions shown in FIGS. 6 to 8 to be described later). The ejector 50 may move freely in the range while the card is being inserted or pulled out.

Specifically, when the ejector 50 is in the temporary holding position, the card 3 may be pulled out through releasing the holding state or the temporary holding state. Accordingly, a portion extending to a side (front) of the card insertion slot 5 may move away from the card 3 accommodated in the reception space 13 of the housing 10 (a side to space away from a recess portion 4 of the card 3).

In the embodiment, the ejector 50 is positioned between the card 3 accommodated in the housing 10 and the spring 70 regardless of the position of the ejector 50. That is, the ejector 50 may be in the holding position or the temporary position. Further, the ejector 50 is biased from the holding position to the temporary holding position through the spring 70.

The ejector 50 may be formed through, for example, punching and bending a sheet of metal. The ejector 50 may be formed of a rigid or flexible member having a spring property. The ejector 50 includes a base end portion 51, a front slope portion 58, a front extending portion 61, a U-shaped portion 59, a rear extending portion 62, and a horizontal protrusion portion 56.

The front slope portion 58 extends along the card insertion and pull-out direction parallel to the spring 70 around the base end portion 51. That is, the front slope portion 58 extends from the base end portion 51 to the card insertion slot 5 side (front side) to fit to a shape of a raised portion 7 of the card 3. At the same time, the front slope portion 58 slopes away from the card 3 accommodated in the housing 10.

The front extending portion 61 extends toward the card insertion slot 5 from the front slope portion 58 in a continuous state. The U-shaped portion 59 extends toward a side to space away from the card 3 (a side to space away from the recess portion 4 of the card 3), and is bent to return to a side of the card 3 accommodated in the housing 10.

In the embodiment, the card 3 is accommodated in the housing 10 in a continuous state with the front slope portion 58 and the front extending portion 61. The rear extending portion 62 extends to an opposite side (rear side) of the card insertion slot 5. Further, the horizontal protrusion portion 56 extends away from the card 3 accommodated in the housing 10 from the base end portion 51 in a direction substantially perpendicular to the card insertion and pull-out direction.

In the embodiment, the front slope portion 58, the U-shaped portion 59, and the front extending portion 61 are all connected to each other through a lower bent portion 65. Further, side surfaces of the front slope portion 58, the U-shaped portion 59, and the front extending portion 61 contact with one another.

When the ejector 50 is provided inside the housing 10, a rear extending portion 66 of the U-shaped portion 59 is supported by a support surface 42 of the sidewall 40 to be slidable. The rear extending portion 66 of the U-shaped portion 59 constitutes a part of the ejector 50 and the support surface 42 of the sidewall 40 constitutes a part of the housing 10 on a bottom surface of the rear extending portion 66.

In the embodiment, a raised portion 54 as a corresponding locking portion is provided in the front extending portion 61. The raised portion 54 may fit into a specific position of the card (the recess portion 4 of the card 3) to lock the card 3. Further, a pin-hole 55 is provided in the horizontal protrusion portion 56 to loosely fit a pin 80.

In the embodiment, a grip portion 64 is provided in an end portion of the rear extending portion 62. The grip portion 64 is bent approximately perpendicular to a side of the card 3 accommodated in the housing 10 (the recess portion 4 of the card 3). Further, a spring holding portion 74 is provided in a center of the U-shape of the U-shaped portion 59 or near the raised portion 54.

The spring holding portion 74 holds an other end portion 73 on a side of the card insertion slot 5 to incorporate the ejector 50 and the spring 70 in the same method as the spring holding portion 72 of the housing 10 that holds the one end portion 71 (FIG. 2) of the spring 70. Thus, the other end portion 73 of the spring 70 is accommodated inside of the U-shaped portion 59.

In the embodiment, the spring holding portion 74 is inserted into a hollow portion of the other end portion 73. Accordingly, the raised portion 54 of the ejector 50 provided on the card insertion slot 5 is integrated with the other end portion 73 of the spring 70 on a side of the card insertion slot 5 near an opposite side of the card (the opposite side of the side in which the card 3 is provided).

As a result, when the raised portion 54 moves away from the recess portion 4 in a direction in which the raised portion 54 intersects with the card insertion and pull-out direction, the other end portion 73 of the spring 70 also moves away from the card 3 accommodated in the housing 10 (a side to space away from the recess portion 4 of the cards 3) integrally. However, in this case, as to be described below, an approximate position of the grip portion 64 provided on the side far from the card insertion slot 5 remains unchanged.

In the embodiment, the slide position of the ejector 50 in the housing 10 may be regulated, for example, through the cover 30 and the housing 10. The ejector 50 has a total of four protrusion portions protruding upwardly or downwardly in order to regulate the slide position. That is, slide guides 52a, 52b, 52c, and 52d are provided in a top portion of the grip portion 64, a top portion of the U-shaped portion 59 near a border of the front extending portion 61 and the U-shaped portion 59, a lower portion of the rear extending portion 62 in near side of the grip portion 64, and a lower bent portion 65 near a facing position of the U-shaped portion 59, respectively.

Each of the slide guides 52a, 52b, 52c, and 52d is formed to protrude upwardly or downwardly. The cover 30 is provided with the guide rails 32a and 32b to correspond with the slide guides 52a and 52b protruding upwardly, while the arm portion 15 of the housing 10 is provided with guide rails 12c and 12d to correspond with the slide guides 52c and 52d protruding downwardly, respectively.

When the ejector 50 and the cover 30 are provided in specific positions in the housing 10, the slide guides 52c and 52d of the ejector 50 engage with the guide rails 12c and 12d of the housing 10, respectively. Further, the slide guides 52a and 52b engage with the guide rails 32a and 32b of the cover 30, respectively. At the same time, a part of the U-shaped portion 59 of the ejector 50 extending to a rear or the bottom surface 67 of the rear extending portion 66 is supported by the support surface 42.

In the embodiment, the support surface 42 is formed through removing a top portion of a front side of the sidewall 40. When the ejector 50 is in the temporary holding position, a portion extending to a side of the card insertion slot 5 moves away from the card 3 accommodated in the housing 10 (a side to space away from the recess portion 4 of the card 3), so that the card can be pulled out. Thus, the guide rail 32b of the cover 30 situated on the side of the card insertion slot 5 and the guide rail 12d of the housing 10 are provided with spaces 34 and 14, respectively, toward a side to space away from the card 3 accommodated in the housing 10 (a side to space away from the recess portion 4 of the card 3).

The pin 80 regulates a movement of the ejector 50 in cooperation with a heart-cam mechanism 18. A center of a distal of the pin 80 is bent in a semicircle downwardly to form an ejector engaging portion 81. The ejector engaging portion 81 is hooked in the pin-hole 55 provided in the horizontal protrusion portion 56 of the ejector 50 to lightly engage the pin 80 with the ejector 50. An end portion is bent to be approximately perpendicular downwardly to form a heart-cam engaging portion 82 in a rear end of the pin 80.

In the embodiment, the heart-cam engaging portion 82 slides while lightly placed on a cam groove 19 of the heart-cam mechanism 18 to communicate an operation of the heart-cam to the ejector 50. The heart-cam mechanism 18 is provided along the insertion and pull-out direction of the card. A floating of the pin 80 sliding on the cam groove 19 is prevented with the cover 30. The operation of the heart-cam will not be explained further here since the heart-cam is the same as the conventional heart-cam.

Next, an operation of inserting and pulling out the card with respect to the card connector 1 will be explained with reference to FIGS. 5 to 10. FIGS. 5 to 8 show an upper surface of the card connector 1 without the cover 30 in order to explain the operation.

Figure 5:
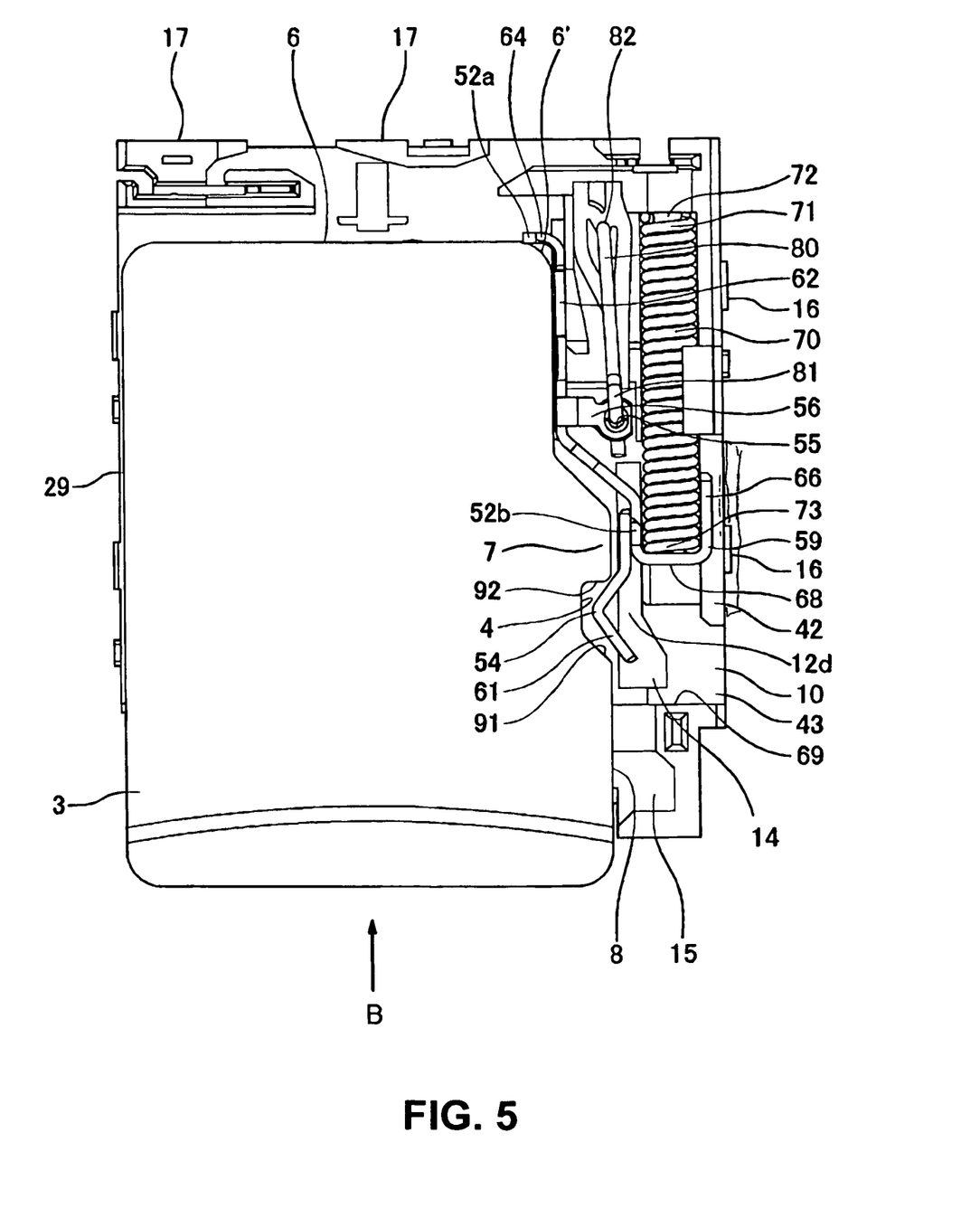
FIG. 5 is a schematic view showing a holding state of the card connector according to the embodiment of the present invention.
Figure 9:
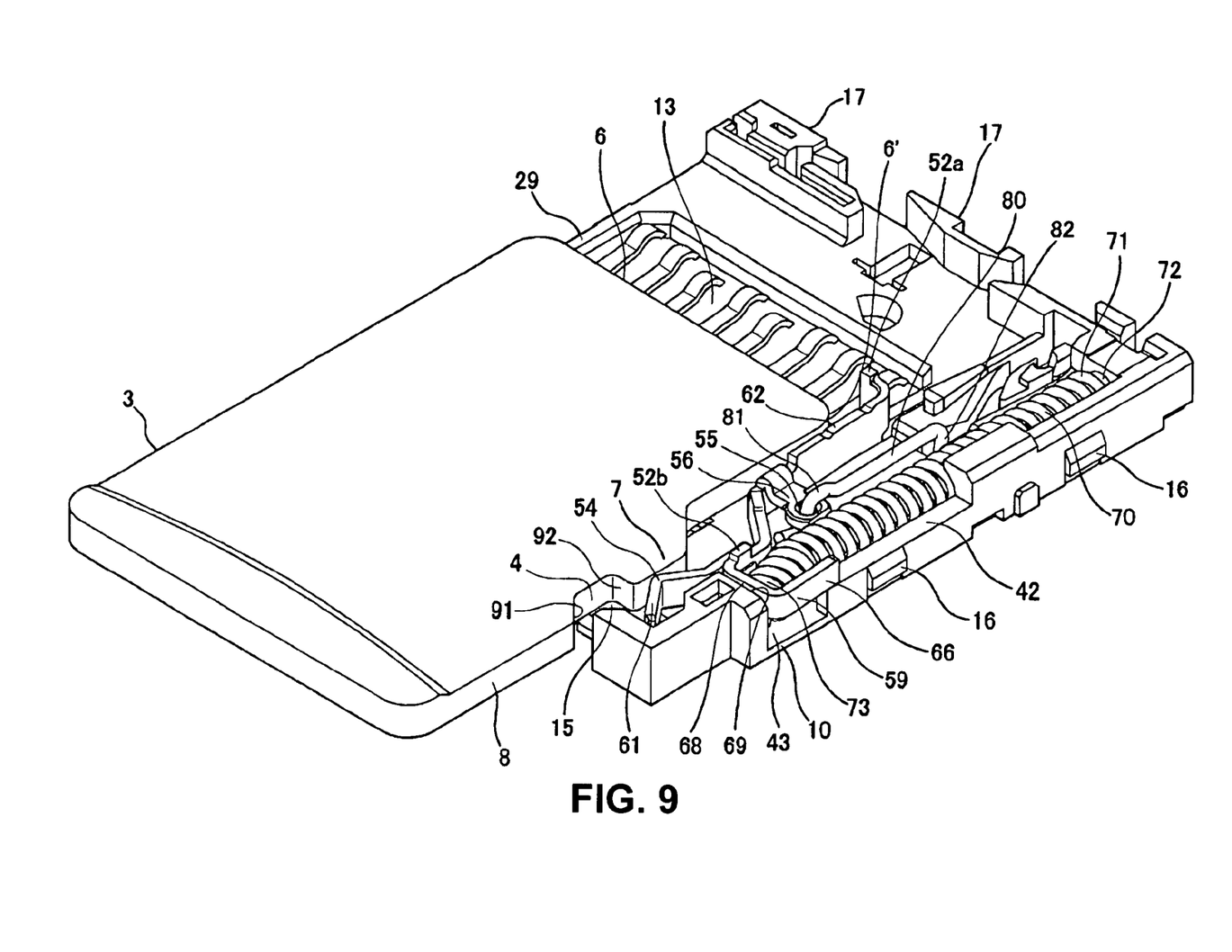
FIG. 9 is a perspective view of the card connector in the state shown in FIG. 7 according to the embodiment of the present invention.
Figure 10:
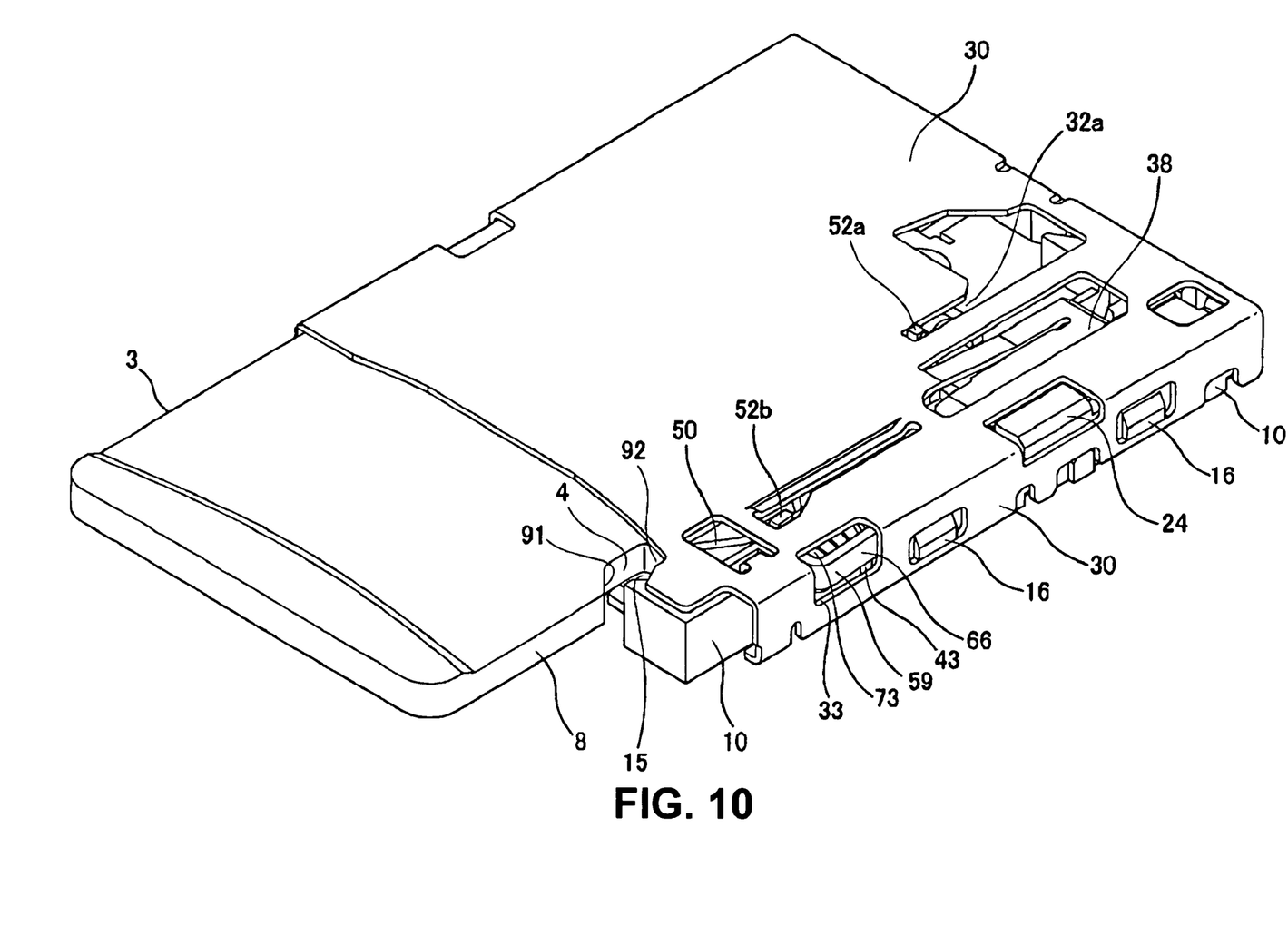
FIG. 10 is a perspective view of the card connector in the state shown in FIG. 7 when a cover is attached according to the embodiment of the present invention.

FIG. 5 shows a holding state; FIG. 6 shows a temporary holding state in which the card is released from the holding position and still temporary held; FIG. 7 shows a state in which the card is pulled out from the temporary holding state; and FIG. 8 shows a state in which the card is released from the temporary holding state. Further, FIG. 9 shows a perspective view of FIG. 7 and FIG. 10 shows a state of FIG. 7 when the cover 30 is attached.

The recess portion 4 is provided in a side surface 8 of the card 3 along the card insertion and pull-out direction for engaging the ejector 50. When the card 3 is actually used, the card 3 is held as shown in FIG. 5. At this time, the raised portion (corresponding locking portion) 54 of the ejector 50 is fitted into the recess portion (locking portion) 4 of the card 3, so that the card 3 is locked.

When the card 3 is pulled out (ejected), the card 3 is once pushed into inside the housing 10 toward a direction indicated by an arrow B in the figure. When the pushing force is suddenly released, the card 3 pops out at a specific speed toward outside in a direction indicated by an arrow C in FIG. 6 through operations of mainly the heart-cam mechanism 18 and the spring 70.

Figure 6:
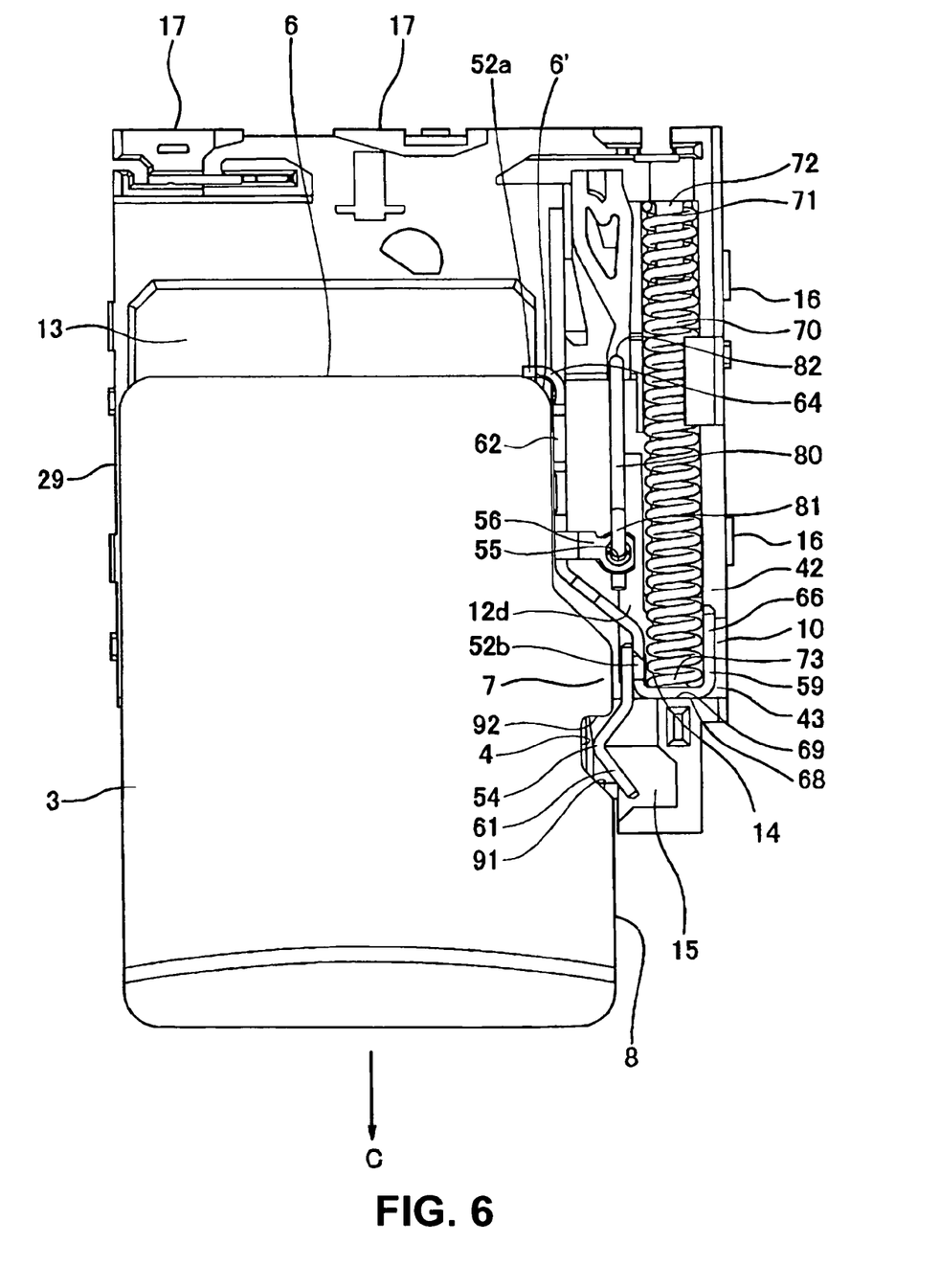
FIG. 6 is a schematic view showing a temporary holding state of the card connector according to the embodiment of the present invention.

When the card is temporary held as shown in FIG. 6, the raised portion 54 of the ejector 50 remains to fit into the recess portion 4 of the card 3. Accordingly, the card 3 does not pop out of the housing 10. That is, in the card connector 1, the recess portion 4 and the raised portion 54 remain to be locked with each other while the card 3 is slidable between the holding position shown in FIG. 5 and the temporary holding position shown in FIG. 6 along the card insertion and pull-out direction.

Figure 7:
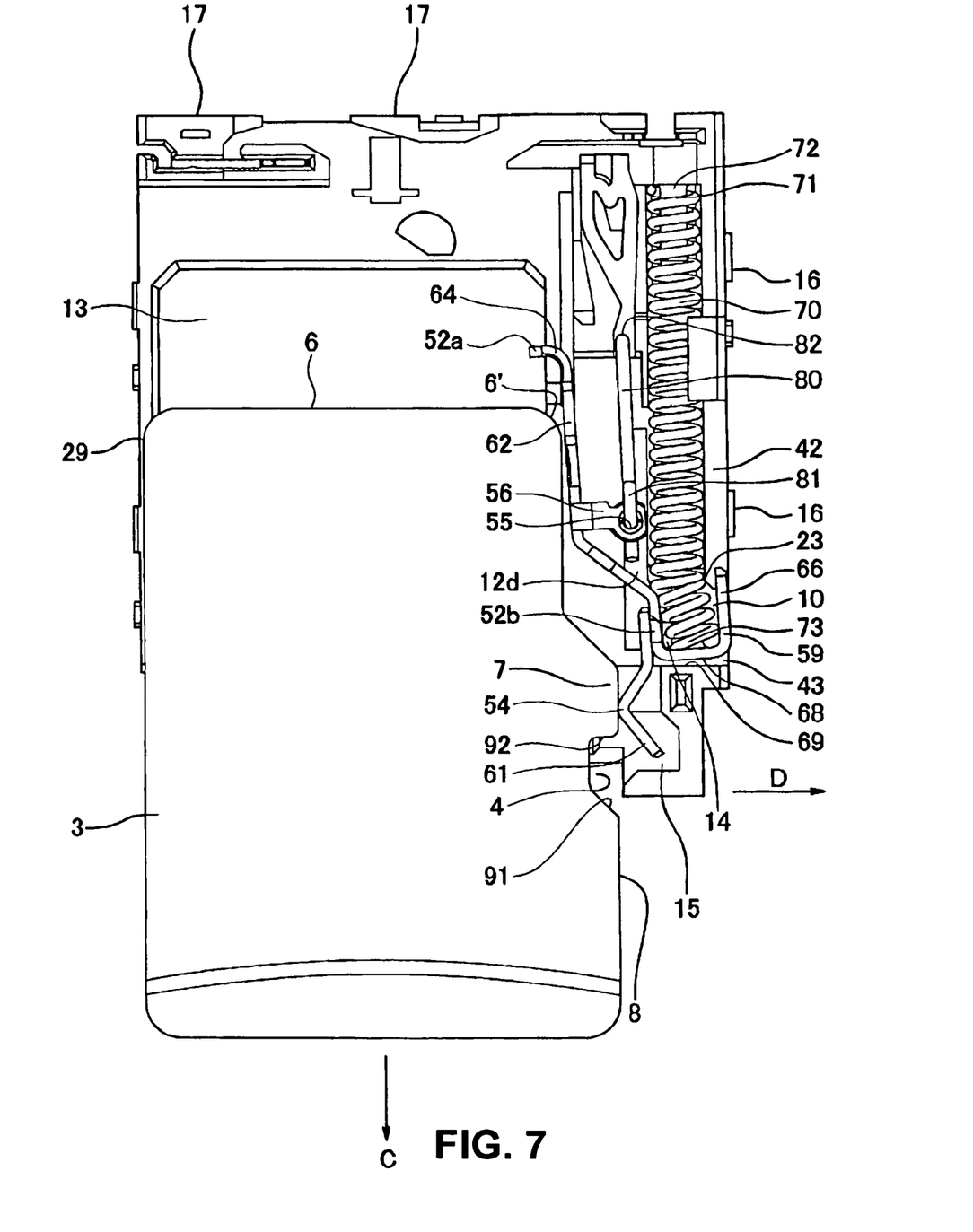
FIG. 7 is a schematic view showing a state of the card connector in which a card is pulled out from the temporary holding state according to the embodiment of the present invention.

When the card 3 is pulled out beyond the temporary holding position toward the card insertion slot 5 in a state that the card 3 is temporary held as shown in FIG. 6, the raised portion 7 of the card 3 provided adjacent to the recess portion 4 contacts with the raised portion 54 as shown in FIG. 7. Further, the ejector 50 is rotated taking the slide guide(s) 52c and/or 52a and an adjacent portion with the card as supporting points through the contact.

The slide guides 52c and 52a are front portions of the ejector 50. The ejector 50 moves away from the recess portion 4 in a direction indicated by an arrow D in which the raised portion 54 fitted into the recess portion 4 intersects with the card insertion and pull-out direction. Accordingly, the recess portion 4 of the card 3 and the raised portion 54 of the ejector 50 are unlocked.

At this time, the raised portion 54 moves (rotates) around near the grip portion 64 of the ejector 50 provided to grip a front surface 6 of the card 3 on a side of the side surface 8 of the card 3. In other words, the supporting point to move to the sidewall direction of the ejector 50 can be obtained through a regulation of the slide guide 52c by the guide rail 12c.

When the ejector 50 moves beyond the temporary holding position, the ejector 50 is regulated through a contact between a front wall 68 of the U-shaped portion 59 of the ejector 50 and a contact surface 69 of the arm portion 15 of the housing 10.

Figure 8:
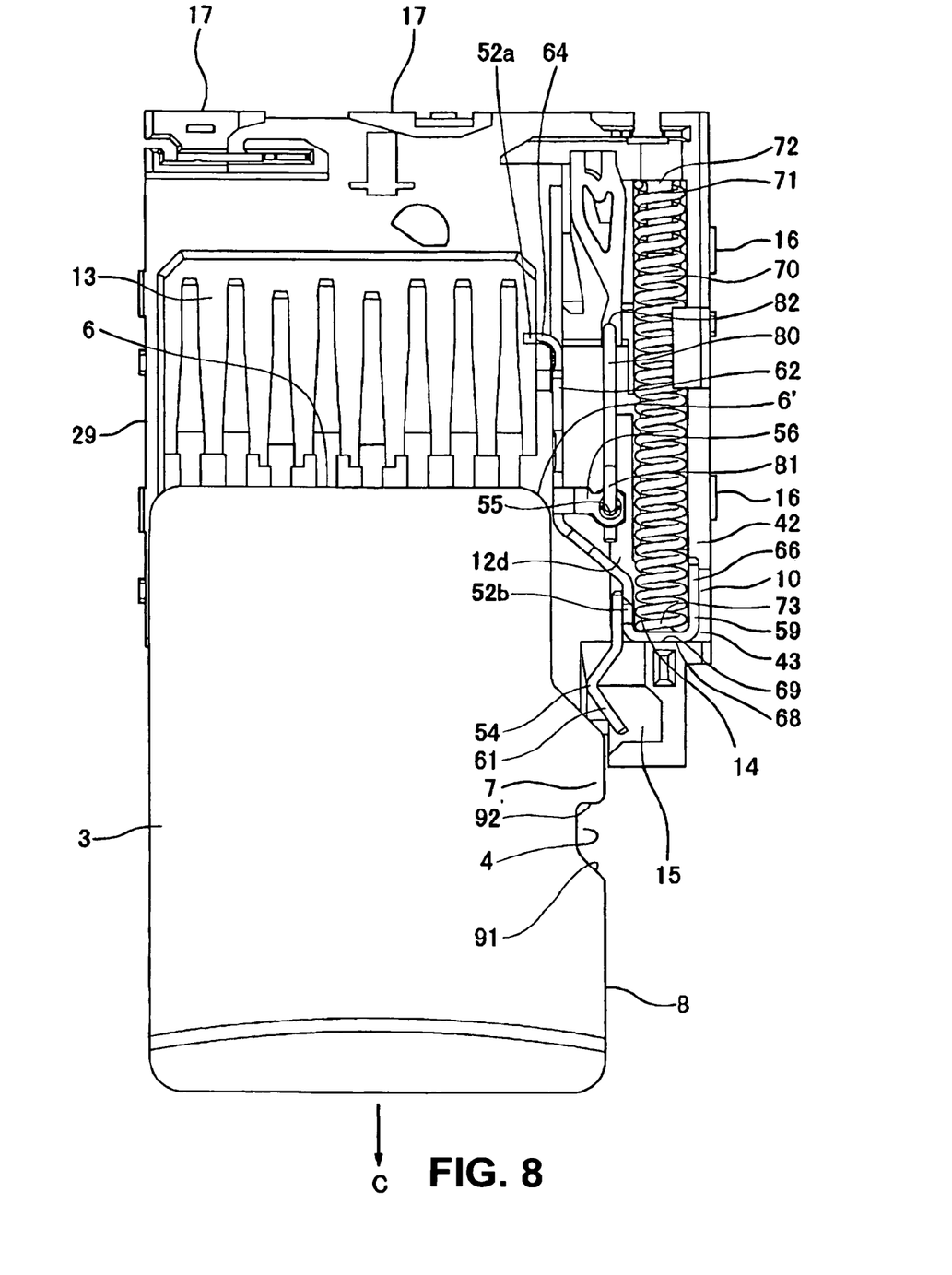
FIG. 8 is a schematic view showing a state of the card connector in which the card is released from the temporary holding state according to the embodiment of the present invention.

FIG. 8 shows a state changed from FIG. 7. That is, in FIG. 8, a contact of the raised portion 7 and the raised portion 54 is released, and the temporary holding state is completely released. Specifically, in FIGS. 6 and 7, it should be noted that the raised portion 54 is interlocked with the end portion (the other end portion) 73 of the spring 70 to move integrally. That is, when the card 3 is pulled out from the temporary holding position, the end portion 73 of the spring 70 needs to be placed near the raised portion 54.

For example, when the ejector 50 is treated as a rigid body, the spring 70 should exist on a side of the ejector 50. On the other hand, when the raised portion 54 of the ejector 50 is bent from the ejector 50, the spring 70 may be situated on a side of the raised portion 54. In these cases, the ejector 50 and the end portion 73 of the spring 70 are interlocked to move away from the recess portion 4 integrally.

A bottom surface side of near the end portion 73 of the spring 70 is made flat, and the sidewall side is open to form a recess portion 43. Accordingly, the spring 70 and the ejector 50 are able to move to a spacing away direction. Since only the end portion 73 that is a part of the spring 70 is structured to be able to move to such a direction, a reaction force at the end portion 73 of the spring 70 upon the movable displacement may be utilized to secure the locking force for the card 3 to be temporary held.

In other words, the locking force between the recess portion 4 and the raised portion 54 may be controlled through the spring 70. For example, when the spring 70 is made of a thick coil, the force produced by such spring 70 in a movable direction of the end portion 73 of the spring 70 or the locking force while in the temporary holding state increases.

On the other hand, when the spring 70 is made of a thin coil, the locking force produced by the spring 70 decreases. Further, when the recess portion 43 is made small, a length of the spring 70 becomes short. Accordingly, the locking force while in the temporary holding state increases. On the other hand, when the recess portion 43 is made large, the locking force decreases.

In regard to this point, in the conventional configuration, the releasing force is made mostly solely through adjusting the rigidity of the ejector 50. Accordingly, the setup becomes difficult. Since the card connector 1 according to the present invention is structured as described, the locking force or the releasing force to unlock may be set in a controlled manner.

When the ejector 50 and the end portion 73 of the spring 70 move away from the recess portion 4, the recess portion 43 that is similar to, for example, a cut portion is provided in a part of a side of the card insertion slot 5 to prevent near the end portion 73 of the spring 70 from contacting the wall 40 provided along a card insertion and pull-out direction on a side to space away from the recess portion 4.

The recess portion 43 as described above avoids a contact of the other end portion 73 of the spring 70 and the sidewall 40. Further, in connection with the recess portion 43, a size of the recess portion 43 is adjusted, which regulates a contacting position 23 (shown in FIG. 8) in which the spring 70 and the inner wall surfaces of the sidewall 40 contact with each other. In other words, the amount that the end portion 73 of the spring 70 protrudes from the sidewall 40 may be properly regulated. Further, the locking force between the recess portion 4 and the raised portion 54 may also be regulated.

As shown in FIG. 10, a move distance of the raised portion 54 may be regulated by a size of an opening 33 provided on a side surface of the cover 30. Further, a tongue piece 36 (indicated by a dashed line in FIG. 2) may be provided inside the opening 33 to regulate the move distance. Accordingly, the amount that the rear extending portion 66 of the ejector 50 protrudes from the housing 10 or the likes through the opening 33 may also adjust the locking force between the recess portion 4 and the raised portion 54. With the configuration described above, a popping of the card upon pulling out (ejection) of the card may be prevented, while the card is locked securely (perfectly) upon insertion of the card.

The disclosure of Japanese Patent Application No. 2006-351563, filed on Dec. 27, 2006 is incorporated in the application by reference.

While the invention has been explained with reference to the specific embodiments of the invention, the explanation is illustrative and the invention is limited only by the appended claims.

What is claimed is:

1. A card connector for connecting a card having a locking portion, comprising:

a housing including a card insertion slot for inserting the card and a reception space for accommodating the card, said housing including a recess portion;

a contact disposed in the housing for contacting with the card;

an ejector disposed in the housing for inserting and pulling out the card in a card insertion and pull-out direction, said ejector including a corresponding locking portion to be locked with the locking portion, said ejector being slidable in the card insertion and pull-out direction between a holding position away from the card insertion slot and a temporary holding position close to the card insertion slot in a state that the corresponding locking portion is locked with the locking portion, said ejector being accommodated in the recess portion to be slidable in a direction crossing the card insertion and pull-out direction when the ejector is situated at the temporary holding position, said corresponding locking portion contacting with the card and moving away from the locking portion in the direction crossing the card insertion and pull-out direction when the card moves toward the card insertion slot beyond the temporary holding position; and an elastic member disposed in the housing for urging the ejector from the holding position to the temporary holding position, said elastic member being arranged along the card insertion and pull-out direction in parallel to the ejector, said elastic member moving away from the locking portion in the direction crossing the card insertion and pull-out direction when the card moves toward the card insertion slot beyond the temporary holding position so that the corresponding locking portion is unlocked from the locking portion.

2. The card connector according to claim 1, wherein said ejector is situated between the reception space and the elastic member in the card insertion and pull-out direction.

3. The card connector according to claim 1, wherein said elastic member is arranged to regulate a locking force between the corresponding locking portion and the locking portion.

4. The card connector according to claim 1, further comprising a cover for covering a top surface of the housing, said cover including a side surface having an opening for regulating an amount of the corresponding locking portion moving away from the locking portion in the direction crossing the card insertion and pull-out direction.

5. The card connector according to claim 1, wherein said ejector further includes at least one of a first slide guide protruding upwardly and a second slide guide protruding downwardly for regulating a slide position of the ejector, at least one of said cover and said housing including at least one of a first guide rail corresponding to the first slide guide and a second guide rail corresponding to the second slide guide, at least one of said first guide rail and said second guide rail having a space extending toward away from the locking portion.

6. The card connector according to claim 1, wherein said ejector further include a first portion extending along the card insertion and pull-out direction in parallel to the elastic member and a second portion extending from the first portion and away from the locking portion in the direction crossing the card insertion and pull-out direction, said second portion being integrated with an end portion of the elastic member on a side of the card insertion slot, said corresponding locking portion being integrated with the end portion near the locking portion, said corresponding locking portion being arranged to move away from the locking portion together with the end portion on the side of the card insertion slot in the direction crossing the card insertion and pull-out direction.

7. The card connector according to claim 1, wherein said ejector further includes a grip portion for griping a front wall of the card, said corresponding locking portion moving away from the locking portion with a portion near the grip portion as a supporting point.

8. The card connector according to claim 1, wherein said housing further includes a sidewall along the card insertion and pull-out direction on a side thereof away from the locking portion with respect to the elastic member, said sidewall including the recess portion so that an end portion of the elastic member moves away from the locking portion and the corresponding locking portion moves away from the locking portion.

9. The card connector according to claim 8, wherein said elastic member is situated at a specific position to contact with the sidewall so that a locking force between the locking portion and the corresponding locking portion is regulated when the end portion of the elastic member moves away from the locking portion.

10. The card connector according to claim 1, wherein said elastic member is formed of a coil spring.

11. The card connector according to claim 1, wherein said ejector is formed of a metal.

12. The card connector according to claim 1, wherein said housing further includes a cam portion.

13. The card connector according to claim 12, further comprising a pin slidable along the cam portion in the direction crossing the card insertion and pull-out direction, said pin engaging the ejector so that the ejector moves in the direction crossing the card insertion and pull-out direction.

* * * * *